J. W. HOFF.
ASH SIFTER.
APPLICATION FILED DEC. 1, 1913.
1,190,899. Patented July 11, 1916.
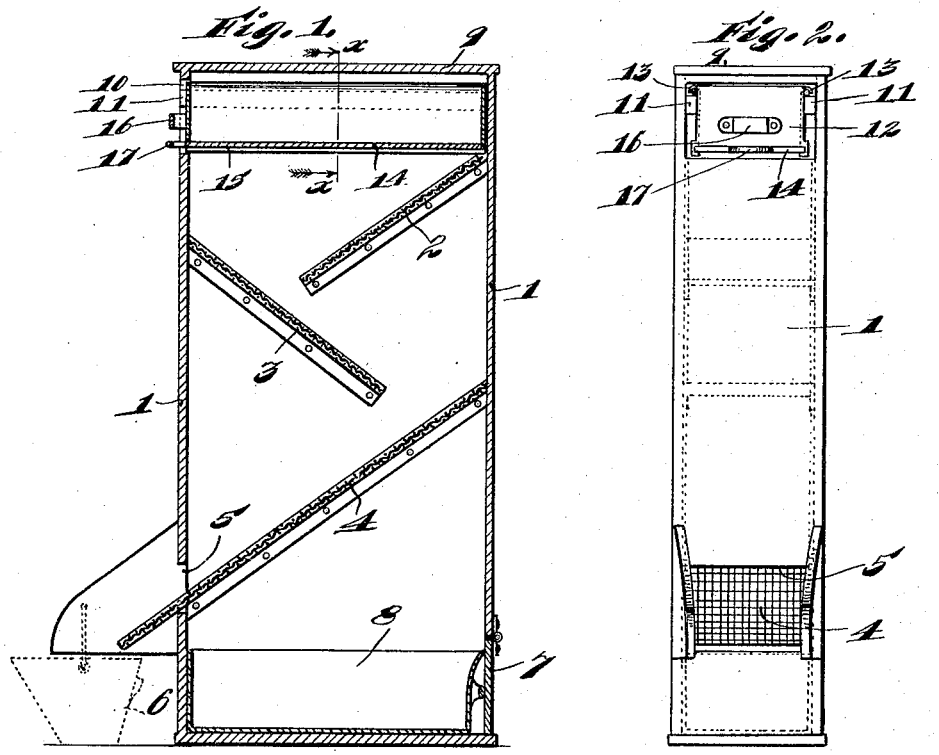
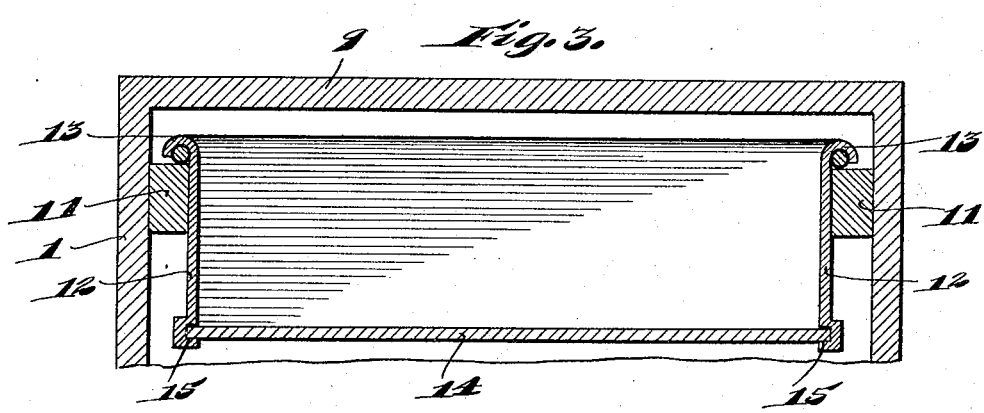
Witnesses:
C. E. Wessels.
B. J. Richards.
Inventor:
John W. Hoff
By Joshua H. Hoff
his Attorney.

UNITED STATES PATENT OFFICE.

JOHN W. HOFF, OF CHICAGO, ILLINOIS.

ASH-SIFTER.

1,190,899.   Specification of Letters Patent.   Patented July 11, 1916.

Application filed December 1, 1913. Serial No. 803,951.

*To all whom it may concern:*

Be it known that I, JOHN W. HOFF, a citizen of the United States, and a resident of the city of Chicago, county of Cook, and State of Illinois, have invented certain new and useful Improvements in Ash-Sifters, of which the following is a specification.

My invention relates to improvements in ash sifters and has for its object the provision of an improved construction of this character which is simple and efficient in operation.

The invention consists in the combinations and arrangements of parts hereinafter described and claimed.

The invention will be best understood by reference to the accompanying drawing forming a part of this specification, and in which—

Figure 1 is a vertical section of a sifter embodying my invention, Fig. 2, a side elevation corresponding to Fig. 1, and Fig. 3, an enlarged section taken on line $x$—$x$ of Fig. 1.

The preferred form of construction as illustrated in the drawing comprises a suitable casing 1 having inclined sieves 2, 3 and 4 arranged therein, one under the other so as to form a tortuous passage for ashes therethrough as shown in Fig. 1. Casing 1 is provided in its lower portion with a discharge opening 5 and sieve 4 is extended through discharge opening 5 so as to be capable of discharging into a bucket or pail 6 as indicated. A door 7 is arranged in the lower portion of casing 1 in the side thereof opposite opening 5 to permit the insertion of a pan 8 under sieve 4 to catch the fine ashes passing therethrough.

An entry opening 10 is provided in the upper portion of one side of casing 1 and supporting strips 11 are secured to the sides of said casing in operative relation with said entry opening, said strips being arranged to support an ash pan 12 which is provided with beads or lips 13 at its upper edges and adapted to slide upon strips 11 as indicated. Ash pan 12 is provided with a slidable removable bottom 14 which is slidable in grooves 15 provided in the lower portions of the sides of pan 12 and pan 12 and bottom 14 are provided respectively with handles 16 and 17 for convenience in manipulating the same.

In use, the pan 12 is employed as the ordinary ash pan for a stove or grate and the ashes are deposited therein in the usual manner. When it is desired to sift the ashes, the pan is inserted into casing 1 through opening 10 and bottom 14 removed by means of handle 17. This permits the ashes to fall upon the sieves 2, 3 and 4 which results in the larger cinders being discharged through opening 10 into pail 6 and the finer ashes being deposited into pan 8 as will be readily understood. It will be observed that one closed end of ash pan 12 practically serves as a closure for entry opening 10 to prevent material escape of dust from the ashes being sifted.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention, what I claim as new and desire to secure by Letters Patent is:

An ash sifter comprising a casing having a closed top and an entry opening in the side thereof; an ash pan slidably mounted in said casing and passing through said opening; a slidably removable bottom for said pan sliding through said opening; and sifting means in said casing below said pan, substantially as described.

In testimony whereof I have signed my name to this specification in the presence of two subscribing witnesses.

JOHN W. HOFF.

Witnesses:
JOSHUA R. H. POTTS,
ARTHUR A. OLSON.